March 1, 1932.  R. S. OSBORNE  1,847,890
ELECTRIC WELDING APPARATUS
Filed Nov 15, 1930   3 Sheets-Sheet 1
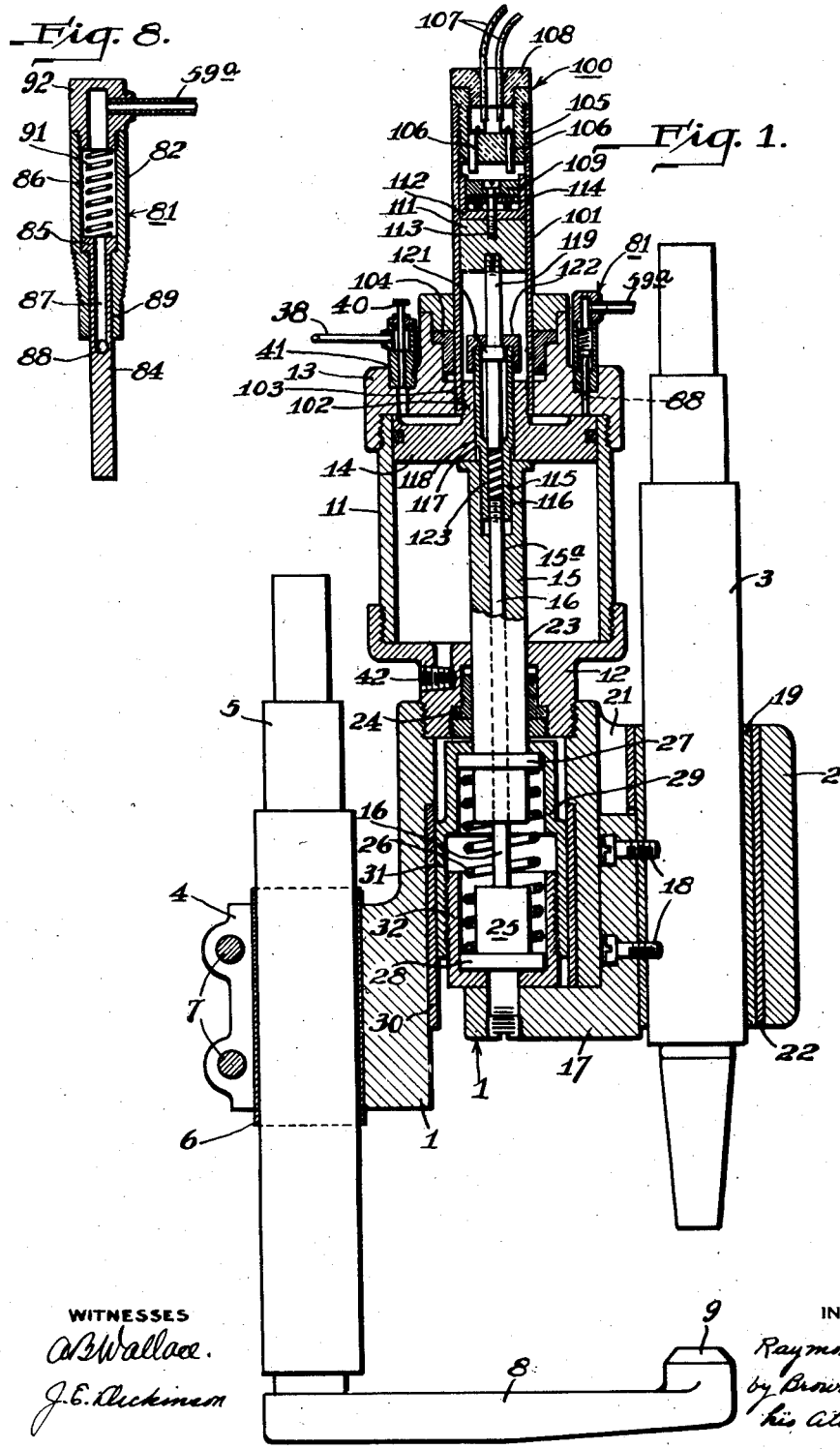
WITNESSES
INVENTOR
Raymond S Osborne
by Brown & Culebour
his Attorneys

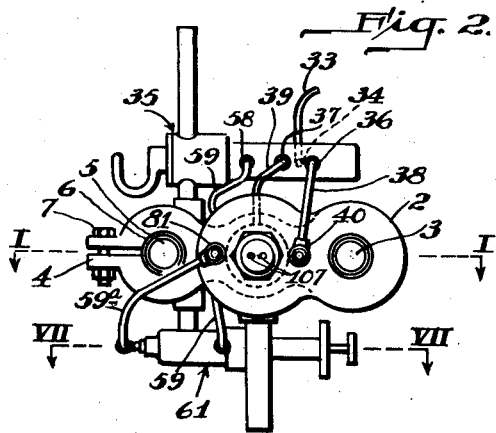
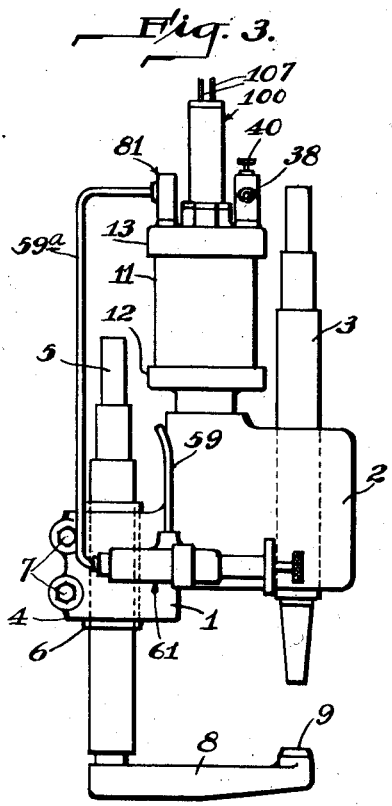
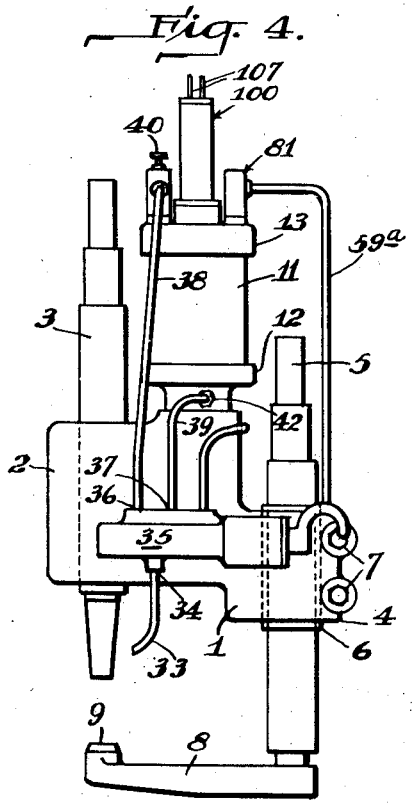

March 1, 1932.  R. S. OSBORNE  1,847,890
ELECTRIC WELDING APPARATUS
Filed Nov 15, 1930  3 Sheets-Sheet 3
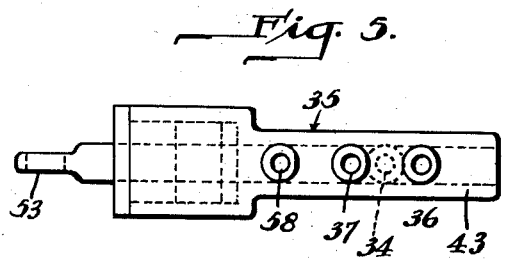
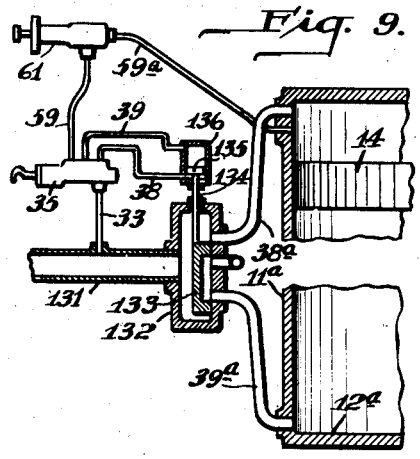
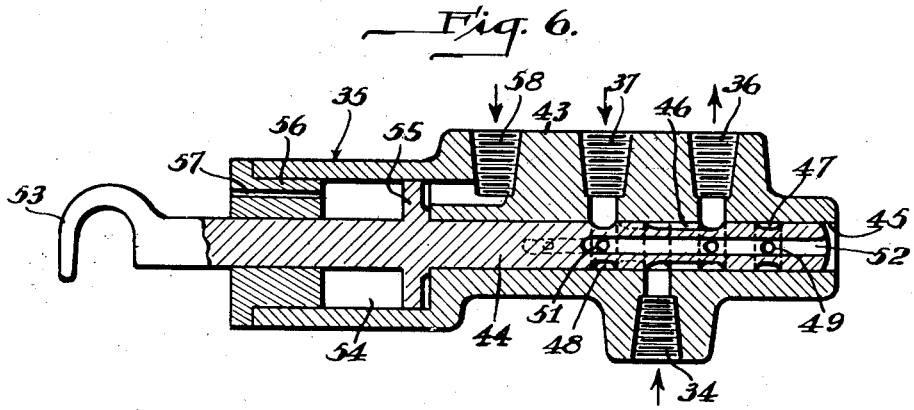
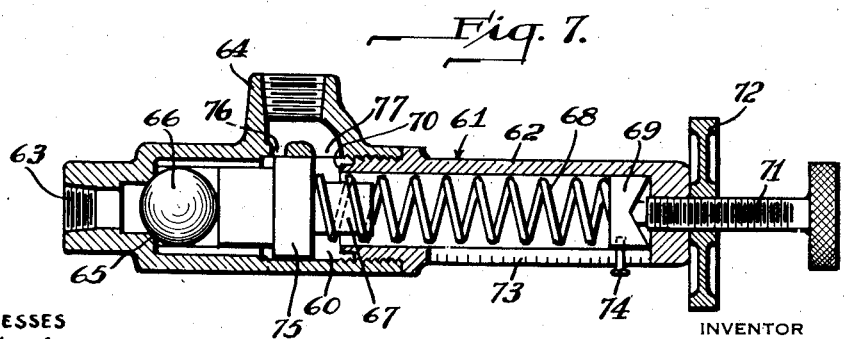
WITNESSES
INVENTOR
Raymond S. Osborne
by Brown & Critchlow
his Attorneys Patented Mar. 1, 1932

1,847,890

UNITED STATES PATENT OFFICE

RAYMOND S. OSBORNE, OF SEWICKLEY, PENNSYLVANIA

ELECTRIC WELDING APPARATUS

Application filed November 15, 1930. Serial No. 495,877.

This invention relates to electric welding apparatus and more particularly to welding machines of the spot weld type.

An important object of the invention is to provide in a spot welding machine for welding articles of varying thicknesses, within certain limits, without necessitating the adjustment of any of the machine parts.

Another object is to provide for automatically controlling the pressure exerted by the machine upon articles being welded in such a manner as to maintain the welding pressure at a predeterminable constant value for successive welding operations independently of variations in thickness of the articles.

A further object is to provide for automatically making and breaking the flow of current to the electrodes during the interval of time an article being welded is gripped between them.

In addition to the objects set forth above there are a number of more particular objects all of which, together with the novel features and advantages of the invention, will become apparent from the following detailed description when read in conjunction with the accompanying drawings, of which Fig. 1 is a longitudinal section taken on the line I—I of Fig. 2 showing in detail the major portion of a portable welding machine constructed in accordance with the invention; Fig. 2 is a plan view and Figs. 3 and 4 are elevational views at reduced scale of the top and two opposite sides respectively of the machine shown in Fig. 1; Fig. 5 is a plan view of a valve mechanism utilized in the machine for controlling the flow of fluid pressure to the movable electrode-actuating mechanism; Fig. 6 is a sectional view taken on the line VI—VI of Fig. 5 showing the valve plunger in full lines in the position it is disposed for effecting the moving of the movable electrode into engagement with a piece of work and in dotted lines in its alternate position for returning the electrode to the latter's inoperable position; Fig. 7 is a sectional view taken on the line VII—VII of Fig. 2 showing the details of a regulating valve utilized to automatically control the pressure exerted on the movable electrode; Fig. 8 is an enlarged view of the auxiliary check valve shown mounted in the top and right-hand side of the cylinder of the machine illustrated in Fig. 1; and Fig. 9 is a schematic view of a modified form of pressure control.

Referring in detail to the drawings, and more particularly to Fig. 1, the embodiment of the invention illustrated comprises a frame proper which consists of a hollow casting 1 having a tubular bracket 2 on one side for the reception of a movable electrode 3 and a similar split bracket 4 on the other for the reception of a fixed electrode 5. In the latter bracket there is arranged an insulating sleeve 6, which insulates the electrode from the machine frame, and a pair of adjusting bolts 7, by means of which the electrode is adjustably secured in the frame. To form a support for the work and arrange electrode 5 in cooperative relation with movable electrode 3, a foot 8 provided with a weld point 9 is detachably mounted on its lower end.

For use in actuating the movable electrode 3, a pressure cylinder 11 is mounted in the top of frame 1, being secured to the frame by a threaded end fitting 12. The upper end of this cylinder is enclosed by a head fitting 13, and in it is arranged a double acting piston 14 which is coupled by means of a connecting rod, consisting chiefly of two telescoping sections 15 and 16, to a support 17 that is in turn secured by a pair of screws 18 and a sleeve 19 to movable electrode 3. To permit the reciprocatory movement of support 17 and assist in guiding the movement of the movable electrode, a vertically disposed groove 21 is formed in frame 1 in the side of the electrode-receiving opening in bracket 2. To protect the wall of bracket 2 against wear a wear resisting sleeve 22 is fitted between it and the sleeve 19 surrounding the electrode.

As illustrated, the piston connecting rod is passed through an opening 23 in the lower end fitting 12 of cylinder 11 and packed to prevent leaking by a packing arrangement 24. The outer section 15 of this rod has a bore 15a extended through its center in which the inner section 16 is arranged for movement. This latter section is subjected to substantially no strains in service as will clearly appear hereinafter, and hence is made comparatively small. Its lower end 25, however, is enlarged to the diameter of the outer section 15 for the reception of a helical spring 26 which is arranged between the lower ends of the two sections and also for receiving the lower end of section 15 and positively transmitting its movement to the movable electrode after spring 26 has been flexed sufficiently to permit such engagement, which occurs when a piece of work is engaged by the movable electrode.

The purpose of the spring 26 is four fold—(1) to provide a yieldable engagement between the movable electrode and the work; (2) to provide a relative motion between the connecting rod sections for operating the controlling switch 100 located at the top of the machine, the operation of which will appear more clearly hereinafter; (3) to provide for holding the pieces being welded firmly in contact at the welding point during the entire time that the current flows through the electrodes, so as to prevent arcing; (4) to also hold the pieces firmly together for a sufficient period after the current ceases to flow, to allow them to cool enough so that they will not pull apart after the pressure on them is released, and it is both sufficiently long and strong to attain these objectives.

On the rod sections 15 and 16 there are formed a pair of shoulders 27 and 28 respectively, which are utilized for receiving the ends of spring 26 and also the ends of a coupling 29 employed to limit the relative movement of the connecting rod sections and prevent them from becoming separated due to gravity and the influence of spring 26. This coupling is formed by a pair of telescopically fitting cup-shaped threaded parts 31 and 32, which are fitted together in such way as to permit their being screwed together or separated at the will of the operator to vary the length of the stroke of the movable electrode, and the compressional strain in spring 26. To assist in guiding the movement of the connecting rod the outer section 31 of coupling 29 is designed to fit smoothly in the central opening of frame 1, and to increase the life of the machine a sleeve 30 made of hard wear-resisting material, which is adapted to be removed and replaced by a new one when worn, is positioned in the frame.

For operating piston 14, any suitable source of fluid pressure, such as compressed air, may be employed, and in the portable machine illustrated such as supplied by a flexible cable 33 which is connected to an inlet port 34 of a valve 35 utilized for controlling the admission of the pressure to the cylinder. From a pair of spaced ports 36 and 37 provided in the upper side of this valve, see Figs. 2, 4, 5 and 6, a pair of conduits 38 and 39 respectively are connected to ports 41 and 42 located in the upper and lower ends of cylinder 11.

As illustrated, valve 35 consists essentially of an open ended tubular housing 43 and a plunger 44 having a grip 53 on its outer end which is arranged to operate in a bore 45. The port 34 is located in housing 43 midway between and on the opposite side thereof from ports 36 and 37, and to selectively establish communication between it and them a comparatively wide annular groove 46 is formed in plunger 44. Spaced from groove 46 an equal distance on either side thereof in plunger 44 are a pair of smaller exhaust grooves 47 and 48 respectively, which are adapted to register with ports 36 and 37 when the plunger is in its alternate position. These grooves are connected, respectively, by openings 49 and 51 with a passage 52 extended through the center of the plunger from its outer exposed end inwardly to a point beyond opening 51, for connecting ports 36 and 37 with the atmosphere when the grooves are in registration with them.

In order to actuate the movable electrode into engagement with a piece of work, plunger 44 is pushed inwardly to its inner position, indicated in full lines in Fig. 6, whereby communication is established by groove 46 between ports 34 and 36, and port 37 is connected by groove 48, opening 51 and passage 52 with the atmosphere. This permits the fluid pressure supplied by conduit 33 to flow through conduit 38 into the upper end of cylinder 11 and the air in the bottom of cylinder 11 to pass out by way of conduit 39 to the atmosphere. With the admission of pressure to the top of cylinder 11 piston 14 is forced downwardly, carrying the movable electrode with it. To vary the speed of operation and render it possible to control the time available for completing the weld, a needle valve 40 is placed in the intake conduit as shown at the top of cylinder 11 to vary the flow of fluid pressure to the work cylinder.

To retrieve the piston and movable electrode, plunger 44 is actuated to its outermost position indicated by dotted lines in Fig. 6. In this latter position groove 46 connects port 34 with port 37 and groove 47 connects port 36 with exhaust passage 52. Hence the fluid pressure is thereby transmitted to the lower end of cylinder 11, and the pressure in the upper end of the cylinder is placed in communication with the atmosphere, with the result that piston 14 is forced upwardly and electrode 3 returned to its normal inoperative position.

In order to obtain satisfactory welds with apparatus of this character, it is necessary to exert the proper pressure upon the article being welded when the weld is made, and it is exceedingly advantageous to be able to do this automatically and in such a way that the pressure may be definitely predetermined. For this reason valve 35 is adapted to be reversed automatically to retrieve the movable electrode as soon as it has exerted the necessary pressure upon the article being welded. To provide for such operation, an enlarged bore 54 is made in the outer end of housing 43 and a piston 55 formed on plunger 44 is arranged for movement therein, the outer end of the bore being closed by a plug 56 which acts as a stop for piston 55 and prevents foreign matter getting into the bore. This plug is provided with a hole 57 drilled through it to allow the piston to move freely. Communicating with the inner end of bore 54 is a port 58, and, as shown in Figs. 2, 3 and 4, this port is in turn connected by means of a conduit 59 through a pressure regulating valve 61 to the upper end of cylinder 11. This latter valve is adapted to prevent the fluid in cylinder 11 being communicated to bore 54 until a predetermined desired pressure is exerted upon piston 14, and upon the pieces being welded.

As shown in detail in Fig. 7, valve 61 comprises a two-part tubular housing 62 in which there is provided an inlet port 63, a valve seat 65, outlet ports 76 and 77, and a valve seat 70 on the opposite end of piston chamber 60 from valve seat 65. The ball valve 66 engages with the valve seat 65, and the plunger 67 engages the valve seat 70. The ball valve 66 is urged against the valve seat 65 by a spring 68 acting through the plunger 67. The plunger 67 has an enlarged section 75 which acts as a piston in chamber 60. The pressure exerted by the spring 68 upon the ball valve 66 to hold it against its seat 65 is regulated by means of an adjusting screw 71, upon which there is provided a lock nut 72 for holding the screw 71 in its selected position. It will be appreciated that when the fluid pressure in the cylinder 11 is sufficient, when acting through the conduit 59a on the exposed area of the valve seat 65, to overcome the pressure exerted by the spring 68, the ball valve 66 will be forced from its seat allowing the fluid pressure to act upon the enlarged section 75 of the plunger 67, snapping it back quickly upon seat 70, whereby it opens the outlet port 76 and allows the pressure fluid to pass from the conduit 59a through the valve and conduit 59 to the cylinder 54 of the valve 35, where it acts upon piston 55, forcing it back and reversing the flow of fluid to cylinder 11, thereby forcing the piston 14 to its inoperative position. The pressure fluid on the opposite side of piston 14 is released to the atmosphere, as previously explained, and when the pressure drops sufficiently the spring 68 forces the ball valve 66 upon its seat 65, and the apparatus is in proper position for another cycle of operation. The area of the seat 70 is greater than the area of seat 65, therefore the valve 66 will not close until the pressure in the cylinder 11 has dropped to an amount which is approximately the same proportion to the pressure at which the valve 66 opens, as the area of the valve seat 65 is to the area of the valve seat 70. This insures the valve 66 staying open a sufficient length of time to operate the piston 55, and also prevents any tendency of the valve to flutter.

In the side of housing 62 of valve 61 there is provided a longitudinal slot 73 and in it a guide screw or pointer 74, secured to cap 69, is arranged for movement. This guide screw or pointer prevents the cap from turning when screw 71 is adjusted and thereby eliminates any twisting strain which might otherwise be induced in the spring. If desired, the slot may be calibrated so that the guide screw or pointer will indicate the pressure at which the valve 61 will open to reverse the flow of fluid to cylinder 11, and release the pressure on the article being welded, or indicate the maximum pressure upon the work by the electrode points. As previously mentioned, this maximum pressure is regulated and set to the predetermined proper amount by means of the adjusting screw 71. A further function of slot 73 is to establish communication between port 58 of valve 35 and the atmosphere to allow free motion of piston 55 when operated manually for producing a motion in either direction of piston 14 in cylinder 11 and consequent motion of the electrode 3.

In order that the pressure required to overcome the starting inertia of piston 14 and electrode 3 may not cause valve 66 to assume its open position and thereby reverse valve 35 before the electrode is moved into engagement with the work, a check valve 81 is provided in the upper end of conduit 59. This valve is mounted in the fitting 13 of cylinder 11 and receives the upper end of conduit 59a. It is a simple valve consisting merely of a casing 82 which is threaded at its lower end and screwed into a threaded port 83 in the fitting. A plunger 84 having a shoulder 85 on its upper end is arranged in the casing 82 in a manner to permit shoulder 85 to engage the bottom of a bore 86 extending through the major portion of casing 82.

In plunger 84 there is provided a downwardly extending passage 87 which terminates in a transverse opening 88 which is spaced upwardly from the lower end of the plunger. The diameter of this plunger is made sufficiently large to close the bore 89 in the casing 82 in which the lower section of the plunger moves and thereby prevent the pressure in cylinder 11 reaching conduit 59 unless the opening 88 is allowed to protrude below the end of casing 82 or the bottom surface of the fitting 13.

For urging plunger 84 to its lower position, a spring 91 is arranged in bore 86 with its upper end resting against a detachable section 92 of casing 82 and its lower end against the top of the plunger. As will be appreciated by reference to Figs. 1 and 3, when the piston 14 is in its normal position of rest at the top of the cylinder 11, see particularly Fig. 1, plunger 84 of valve 81 is forced upwardly into casing 82, whereby the pressure in cylinder 11 is prevented from getting into the conduit 59 until the piston has moved away from fitting 13 sufficiently to allow the plunger to project downwardly into the cylinder sufficiently to uncover the opening 88. Thus the initial high pressure necessary to overcome the starting resistance of piston 14 and electrode 3 is prevented from being impressed upon regulating valve 61 until the piston is in motion. As will be readily appreciated, if this initial pressure were permitted to reach valve 61 at the instant pressure is applied to piston 14, when the valve is adjusted for allowing but comparatively light pressure on the electrode, it may be opened and valve 35 reversed before the piston 14 gets under way, as the pressure necessary to start the piston on its downward travel may in such cases exceed the pressure to which valve 61 is adapted to automatically respond.

A further feature of the invention resides in the provision of means operated automatically during the interval of time an article being welded is gripped by the electrodes, by the movement of piston 14 for making and breaking the electric circuit, not shown, which is employed to supply the electrodes with current. Toward this end a circuit interrupter 100, see Fig. 1, is mounted on the upper end of piston 14. A support for this switch is formed by a tubular casing 101 which is passed through an opening 103 in the cylinder head fitting 13 and adjustably attached to a boss 102 on the top side of the piston, leakage between fitting 13 and casing 101 being prevented by a packing arrangement 104 secured about the casing in the fitting 13. In the upper end of casing 101 there is threaded a cup-shaped insulating fitting 105 which carries a pair of circuit-making contact studs or terminals 106 to which a pair of flexible conductors 107 are attached, the latter being in turn connected to the apparatus, not shown, for supplying current to the electrodes. To protect this fitting and conductors 107 against injury by contact with other objects, a hollow plug 108 is screwed into the upper end of fitting 105.

The inner member of the switch which is of a semi-stationary character is formed by a contact bridging element 109. This is mounted on a plunger 111 to engage the terminal studs 106 when they are moved into engagement therewith. The plunger 111 comprises an annular block of insulating material for insulating bridging member 109 from the metallic structure of the machine. Between the bridging member 109 and block 111 there is arranged a cup-shaped section 112 of asbestos or other similar heat-resisting material, both being secured to block 109 by a screw 113. To prevent any arcing or sparking, which may occur when the switch is operated, from burning the walls of casing 101 or otherwise injuring the switch, the side wall of cup section 112 is extended upwardly above the bridging member 109 sufficiently so that the terminal studs are completely covered thereby when the switch is closed. To insure a contact between the studs 106 and the bridging member 109, when they are moved into engagement with each other, a disk spring 114 is mounted between the bridging member and plunger 109, whereby member 109 is capable of automatically adjusting itself to engage both studs.

For operating the switch, the inner section 16 of the connecting rod attached to piston 14 is extended to approximately the top of rod section 15 and attached to a sleeve 115 movably arranged in the upper end of section 15 and piston 14. The bore in the upper end of rod 15 is enlarged at 116 to receive this sleeve, and a similar bore is extended through piston 14 for the same purpose. The latter bore is increased at 117 to accommodate a corresponding increase 118 in the sleeve itself. A stem 119 provided with an annular shoulder 121 midway between its two ends is connected to plunger 111 and extended downwardly into sleeve 115, shoulder 121 being adapted to move in the upper enlarged portion 118 of the sleeve. A cap 122 is screwed on the upper end of the sleeve to engage shoulder 121, and hold it in sleeve 115. To normally hold the plunger 111 in its upper position and provide a yieldable engagement between the fixed and movable parts of the switch, as well as to allow for relative movement of the connecting rod sections after electrode 3 is moved into engagement with a piece of work, a spring 123 is placed beneath the lower end of stem 119 and the upper end of rod section 16. In accordance with such a construction all of the parts carried by piston 14 move with the piston as it first starts on its downward travel. However, when the electrode 3 engages the work, spring 26 starts to flex and the connecting rod sections 15 and 16 to move relative to each other, the relative movement thereof continuing as piston 14 forces section 15 downwardly over section 16. Due to the relative movement of section 16 with respect to section 15 of the connecting rod, studs 106 in the end of casing 101 are caused to overtake plunger 111 and a circuit is thereby completed through the circuit bridged by member 109, and hence the apparatus, not shown, which is dependent upon the operation of the switch for supplying current to the electrode is set in motion to establish a flow of current to the electrodes. After engagement is made between the bridging member 109 and the terminal studs 106, the continued relative movement of the connecting rod sections 15 and 16 which continues until rod 15 engages the enlargement 25 of rod 16 is absorbed by the spring 123 located in sleeve 115. In a reverse manner, when the piston 14 is retrieved, due to the unflexing of spring 26, the movable electrode 3 is held in contact with the work until some time after the piston starts on its backward travel. A reverse relative movement also takes place between the connecting rod sections 15 and 16. As this latter relative movement continues, spring 123 is unflexed until shoulder 121 on stem 119 engages cap 122. Then the studs 106 are permitted to move away from the bridging member 109 and the current circuit to the electrode is broken, this breaking of the circuit taking place before the movable electrode passes out of engagement with the work. By adjusting casing 101 on boss 102 the closing and opening of the switch may be made to occur any time during the portion of the stroke that the electrode points are in contact with the work.

To operate the machine, valve 61 is first adjusted as well as the circuit controlling switch. When in readiness, a piece of work is placed between the electrodes, and the plunger 44 of valve 35 pushed inwardly. As set forth above, when this is done pressure is applied to the upper end of cylinder 11 and the piston 14 moved downwardly carrying the movable electrode into engagement with the work. As the electrode engages the work, the spring 26 is flexed, causing section 15 of the connecting rod to move downwardly over section 16 as the pressure is increased. Due to this movement, terminal studs 106 of the circuit controlling switch are moved into engagement with the semi-fixed bridging member 109, closing the switch. As a result of this the current is admitted to the electrodes. Simultaneously with the downward movement of the piston, plunger 84 of the check valve 81 moves downwardly in the cylinder until the shoulder 85 of plunger 84 engages the bottom of the bore 86. In such position the hole 88 in the plunger projects below the end of the casing 82, and the pressure in cylinder 11 is communicated to the valve 61. When the piston approaches the lower end of its stroke and the connecting rod section 15 engages the lower end of section 16, it positively urges the electrode against the work. At such time the pressure in the piston builds up, due to the resistance offered by the work to the movement of the electrode and piston. When this pressure attains a value corresponding to the pressure desired to be applied to the work, valve 61 opens automatically and communicates the pressure by way of conduit 59 to the piston 55 located in boring 54 of valve 35 and the plunger 44 is thereby automatically moved to its outer position. When the latter reaches such position, the flow of pressure to the top cylinder 11 is shut off and in turn communicated to the lower end of the cylinder in the manner previously described, causing the piston and movable electrode to be returned to their upper or normal inactive position in readiness for a repetition of the cycle of operation.

In large machines where the amount of air required to operate the movable electrode is quite substantial and it is impractical to control its flow to and from the operating cylinder, by a simple valve mechanism of the nature of valve 35, a pressure control system such as illustrated diagrammatically in Fig. 9 may be employed. In accordance with this construction the fluid pressure is supplied to the work cylinder indicated at 11$a$ from a conduit 131 in which there is located a valve mechanism 132 equipped with a slide valve 133. This slide valve is connected by a rod 134 to a piston 135 located in an auxiliary cylinder 136 and is operated in accordance with the control of fluid pressure admitted to the auxiliary cylinder, and which in turn is controlled by valve 35 in the same fashion as the flow of pressure to the cylinder 11 in the machine previously described, the pressure being carried to the work cylinder from valve 132 by conduits 38$a$ and 39$a$.

In accordance with the invention, as will be readily appreciated by those skilled in the art, the pressure exerted on the weld is automatically determined by the welding machine and the inaccuracies of the operator are thereby eliminated. This both tends to increase the speed of welding and improves the welds. Furthermore, through the novel construction provided, variations in thicknesses of successive pieces of work being operated upon in no way interfere with the application of the welding pressure which the machine is previously selected to automatically exert on the welds. Another advantage of the invention resides in the provision made for automatically controlling the flow of current to the electrodes, which, as described, is adapted to admit the current to the electrodes only after the engagement is made between them and the work, and interrupts it before the contact with the work is broken after the weld is made.

According to the previsions of the Patent Statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. An electric welding apparatus comprising in combination a pair of spaced electrodes, power operable means coupled with said electrodes for moving them into engagement with a piece of work disposed between them, means responsive to the pressure exerted on the electrodes by said actuating means for automatically releasing the electrodes when said pressure attains a predetermined value, and means operated in accordance with said electrode actuating means for automatically admitting a flow of current to the electrodes after the work is engaged by them and interrupting such flow before they are moved out of engagement with the work after being released.

2. An electric welding apparatus comprising in combination a fixed electrode, a movable electrode operably associated with said fixed electrode, power means yieldably connected to said movable electrode for moving it toward and away from the fixed electrode, a source of power for operating said means, and pressure responsive means adapted to release the power when the pressure exerted on the movable electrode reaches a predetermined value.

3. An electric welding apparatus comprising in combination a fixed electrode having a movable electrode operably associated therewith, power operable means yieldably connected to said movable electrode for moving it towards and away from the fixed electrode, a source of power for actuating said power operable means, means for controlling the application of the power, means responsive to the pressure exerted on the movable electrode for automatically releasing the power when said pressure attains a predetermined value, and means automatically responsive to the movement of said power operable means for controlling a flow of current to said electrodes.

4. An electric welding apparatus comprising in combination a fixed and a movable electrode, power operable means yieldably connected by a relatively movable multiple part connecting rod to said movable electrode, a source of power for actuating said power operable means, and means responsive to the relative movement of the parts of said connecting rod for controlling the flow of current to the electrodes.

5. An electric welding apparatus comprising in combination a fixed and a movable electrode, power operable means yieldably connected by a relatively movable multiple part spring biased connecting link to the movable electrode, a source of power for actuating said power operable means and said movable electrode, means for controlling the power applied to said power operable means, means responsive to the pressure exerted upon said power operable means for automatically rleasing the pressure exerted on the movable electrode, and means responsive to the relative movement of the parts of said connecting links when a piece of work is engaged by the movable electrode for controlling the flow of current to the electrodes.

6. An electric welding apparatus comprising in combination a fixed and a movable electrode, power operable means yieldably connected by a relatively movable multiple part connecting link to said movable electrode, a source of power for actuating said link and movable electrode, and means actuated by the relative movement of the connecting link parts for automatically admitting a flow of current to the electrodes after the movable electrode is moved into engagement with a piece of work and for interrupting said flow before said electrode is moved away from the work.

7. An electric welding apparatus comprising in combination a fixed and a movable electrode, power operated means yieldably connected by a relatively movable multiple part connecting link to said movable electrode, a source of power for actuating said link and movable electrode, means for controlling the application of said power, means automatically responsive to the pressure exerted on said power operated means for releasing said electrode when the pressure exerted on the movable electrode attains a predetermined value, and means actuated by the relative movement of the connecting link parts when the movable electrode is moved into and out of engagement with a piece of work for automatically admitting a flow of current to the electrodes after the movable electrode makes engagement with the work, and for interrupting said current before it leaves the work.

8. An electric welding apparatus comprising in combination a fixed electrode, a cylinder associated therewith, a piston arranged in said cylinder, a movable electrode secured to said piston, means for supplying a fluid pressure to and exhausting it from the cylinder to operate said piston, means for controlling the admission and exhaustion of fluid pressure to and from the cylinder, and means responsive to the pressure in the cylinder adapted to automatically control the operation of said fluid admission and exhaustion controlling means.

9. An electric welding apparatus comprising in combination a fixed electrode, a cylinder associated with said electrode, a piston arranged in said cylinder, a movable electrode operably connected to said piston, means for supplying a fluid pressure to and exhausting it from the cylinder whereby to operate said movable electrode, means for controlling the admitting and exhausting of the fluid pressure to and from the cylinder, means responsive to the pressure in the cylinder when the movable electrode is moved into engagement with a piece of work for automatically releasing said electrode when the pressure in the cylinder attains a predetermined value, and means responsive to the movement of said piston and movable electrode for controlling a flow of current to the electrode.

10. An electric welding apparatus comprising in combination, a fixed electrode, a cylinder associated with said electrode, a piston arranged in said cylinder, a movable electrode operably coupled to said piston and arranged for cooperation with the fixed electrode, means for supplying fluid under pressure to said cylinder, a valve for controlling the flow of said fluid, manual means for operating said valve to admit the flow of fluid to the cylinder, and means for automatically operating said valve in response to the pressure exerted on said piston.

11. An electric welding apparatus comprising in combination, a fixed electrode, a cylinder associated with said electrode, a piston arranged in said cylinder, a movable electrode operably coupled to said piston, means for supplying fluid under pressure to said cylinder to move said piston and movable electrode, a valve for controlling the flow of said fluid pressure, manual means for opening said valve to admit pressure to the cylinder, fluid pressure responsive means for closing the valve, means for communicating fluid pressure from said cylinder to said valve closing pressure responsive means, and a pressure responsive valve disposed in said fluid pressure communicating means for preventing fluid pressure reaching said first mentioned pressure responsive valve until a predetermined pressure is established in said cylinder.

12. An electric welding apparatus comprising in combination, a fixed electrode, a cylinder associated with said electrode, a piston arranged in said cylinder, a movable electrode operably coupled to said piston, means for supplying fluid under pressure to said cylinder, a valve for controlling the flow of said fluid pressure, means operable at the will of the operator for opening said valve to admit the fluid pressure to the cylinder, fluid pressure operable means for closing said valve, a conduit connecting said cylinder with said valve actuating fluid pressure responsive means, a regulating valve disposed in said conduit and adapted to open in response to a predetermined pressure in the cylinder and admit fluid pressure to said valve actuating means, and means for preventing fluid pressure being admitted to said conduit until said piston is moved from its normal position of rest a predetermined distance.

13. An electric welding apparatus comprising in combination, a fixed electrode, a cylinder enclosed at both ends associated wth said electrode, a piston arranged in said cylinder, a movable electrode operably coupled to said piston means for supplying a fluid pressure to the opposite ends of said cylinder, a valve for selectively directing the flow of fluid pressure into and out of the opposite ends of the cylinder, means operable at the will of the operator for operating said valve to admit fluid pressure to one end of the cylinder whereby to effect the moving of said piston in a direction to move the movable electrode in to engagement with a piece of work rested against the fixed electrode, fluid pressure responsive means for moving said valve to reverse the flow of fluid pressure to the cylinder and retrieve the movable electrode, a conduit for communicating pressure from the driving end of the cylinder to the valve-actuating pressure responsive means, and a pressure regulating valve arranged in said conduit for automatically admitting fluid pressure to the valve-actuating means when the pressure in the driving end of the cylinder reaches a predetermined value.

14. An electric welding apparatus comprising in combination a fixed electrode, a cylinder associated with said electrode, a piston arranged in said cylinder, a movable electrode arranged to cooperate with said fixed electrode, a sectional connecting rod consisting of relatively movable parts connecting said piston to said movable electrode, a spring member urging said connecting rod parts in a given direction, means for moving said piston to carry said movable electrode toward and away from said fixed electrode, a circuit controller mounted on said piston, means responsive to the relative movement of said connecting rod parts for closing and opening said circuit controller whereby the flow of current to the electrode is established and interrupted during a predetermined portion of the stroke of the piston.

15. An electric welding apparatus comprising in combination a pair of spaced electrodes, power operable means acting upon said electrodes for applying a pressure to a piece of work disposed between them, means responsive to the pressure exerted on the electrode for automatically releasing them when the pressure attains a predetermined value, and means operated in accordance with the pressure exerted by the electrodes upon the work for automatically admitting a flow of current to tne electrodes after the work is engaged by them, and interrupting such flow before the electrodes leave the work after being released, and means for varying the pressure which the electrodes will exert upon the work.

16. An electric welding apparatus comprising in combination a pair of spaced electrodes, power operable means adapted to move said electrodes and apply a pressure on a piece of work disposed between them, means responsive to the pressure exerted on the electrodes by said actuating means for automatically releasing the electrodes when said pressure attains a predetermined value, and means operated in accordance with the pressure exerted by the electrodes upon the work for automatically admitting a flow of current to the electrodes after the work is engaged by them and interrupting such flow before the electrodes leave the work after being released, and means for varying the relative movement of the electrodes.

In testimony whereof, I sign my name.

RAYMOND S. OSBORNE.